United States Patent [19]

Peterson

[11] 4,437,784
[45] Mar. 20, 1984

[54] ADJUSTABLE SHIM SYSTEM

[75] Inventor: Francis C. Peterson, St. Charles, Ill.

[73] Assignee: Illinois Tool Works Inc., Chicago, Ill.

[21] Appl. No.: 343,623

[22] Filed: Jan. 28, 1982

[51] Int. Cl.³ ............................................. F16B 37/02
[52] U.S. Cl. .................................... 403/408; 29/432.2;
   29/526 R; 411/547; 411/387; 411/171; 308/244
[58] Field of Search ................... 29/526 R, 432, 432.2;
   308/244; 403/408, 407, 405; 411/387, 546, 547,
   154, 171, 176; 188/201

[56] References Cited

U.S. PATENT DOCUMENTS

| | | | |
|---|---|---|---|
| 1,363,789 | 12/1920 | Howarth | 308/244 UX |
| 1,451,224 | 4/1923 | Johns | 308/244 X |
| 1,876,386 | 9/1932 | Baynes | 411/171 X |
| 1,945,332 | 1/1934 | Robinson | 403/408 X |
| 2,330,102 | 9/1943 | Yarnall | 411/547 X |
| 2,626,156 | 1/1953 | Bergh | 411/546 X |
| 3,136,206 | 6/1964 | Adams | 411/546 |
| 3,356,404 | 12/1967 | Peters | 403/408 |
| 3,869,219 | 3/1975 | Wilson et al. | 403/408 X |
| 4,193,434 | 3/1980 | Wagner | 411/154 |
| 4,238,165 | 12/1980 | Wagner | 403/408 |

FOREIGN PATENT DOCUMENTS 788329  12/1957  United Kingdom ................ 411/171

*Primary Examiner*—Charlie T. Moon
*Attorney, Agent, or Firm*—Donald D. Mondul; Thomas W. Buckman

[57] ABSTRACT

A spacing or shimming system for accurately securing a workpiece to a work-securing surface with a predetermined space between these two surfaces. A collapsible shim device includes a support securement surface and a workpiece supporting surface interconnected integrally by a selectively displaceable strut having a knee section which is particularly adapted to permit the workpiece supporting surface to become closer to the support securement surface upon significant compression. A further part of this system includes a self-drilling and threading fastener having a spacing or supporting washer.

4 Claims, 8 Drawing Figures

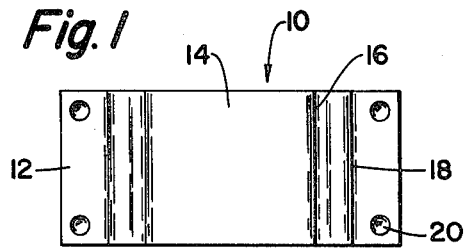
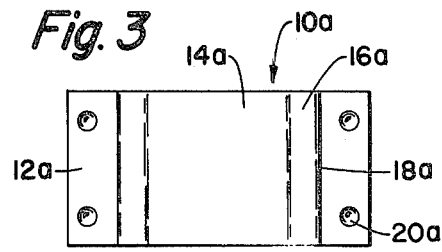
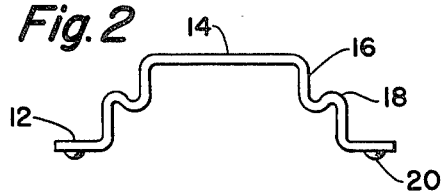
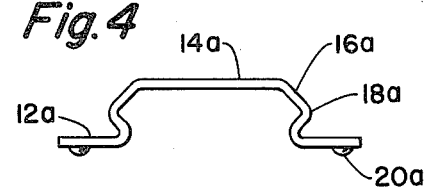
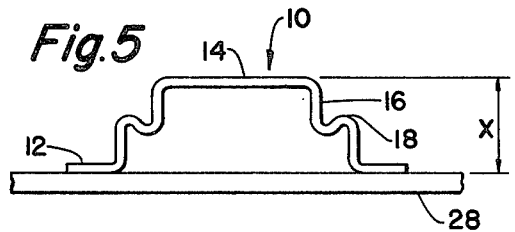
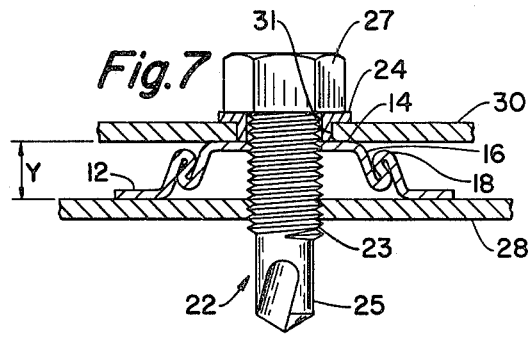
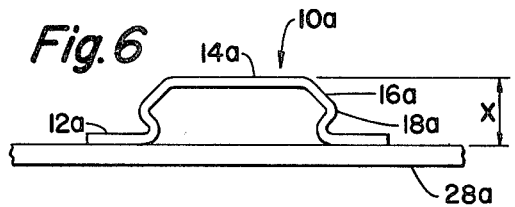
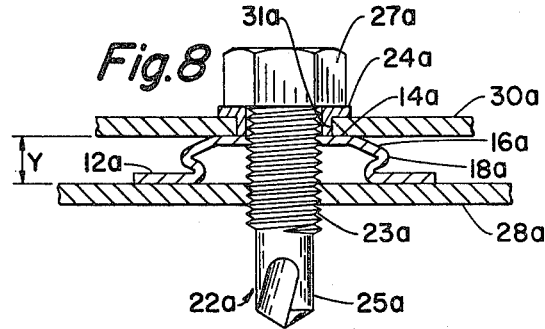

4,437,784

ADJUSTABLE SHIM SYSTEM

BACKGROUND OF THE INVENTION

In the assembly of many diverse structures, such as automobiles, buildings, appliances, etc., it is often necessary to place a cover or exposed sheet metal or plastic structure on a frame or supporting structure in a manner which secures the outer workpiece to the structure in a very accurately determined spaced relationship to one another and in such a manner as to prevent vibrations and relative movement to one another.

Many diverse manners of achieving this are known, and the prior art techniques all involve expensive, time consuming and complicated shimming applications.

The subject invention utilizes a system which eliminates the expense and handling of the prior art devices and utilizes a single metal shim member which is designed to be secured to the substructure in such a manner as to have a first configuration which presents a surface spaced from the substructure a predetermined distance. The ultimate, accurate dimensional spacing is achieved by carefully preferably computer controlled, precompressing or collapsing of this device in a manner prescribed by the actual operation. This is followed by the actual securement of the support member utilizing a self-drilling threaded fastener which carefully controls and maintains the predetermined required spacing at the location.

BRIEF DESCRIPTION OF THE DRAWINGS

FIG. 1 is a bottom plan view of one embodiment of the shim device;

FIG. 2 is an end elevational view of the shim device shown in FIG. 1;

FIG. 3 is a bottom plan view of an alternate version of a shim device of this invention;

FIG. 4 is an end elevational view of the device shown in FIG. 3;

FIG. 5 is an end elevational view of the device of FIG. 1 secured to the support structure;

FIG. 6 is an end elevational view of the device shown in FIG. 4 secured to a support structure;

FIG. 7 is a sectional view in elevation showing the device shown in FIG. 1 in a completed shimmed system; and FIG. 8 is an end elevational view in section showing a shim device as shown in FIG. 4 is a completed shim assembly.

BRIEF DESCRIPTION OF THE PREFERRED EMBODIMENTS

The device 10 is shown to include a pair of flanges 12 forming a support structure securing surface and a top, imperforate web, 14 spaced from the first surfaces 12 a predetermined distance "X". The surfaces 12 and 14 are interconnected by strut means 16 which includes, in this embodiment, an S-shaped knee element 18 which is designed to include, bend lines in predetermined positions for purpose to be described later herein.

FIGS. 3 and 4 describe an alternate embodiment of this invention wherein device 10a includes flange surfaces 12a and spaced imperforate web surface 14a interconnected by strut means 16a which also includes a knee region 18a.

In each of the embodiments 10 and 10a, weld points 20 and 20a are provided for securement to a support structure, such as 28 and 28a, shown in FIGS. 5-8.

While not limited to such environment, this system is of significant advantage in the automotive industry where support structures 28 and 28a are the frame of the automobile and workpiece members 30, 30a are fenders or panels.

Turning to FIGS. 5 and 6, it will be shown that devices 10 or 10a can be secured to surface support structures 28 or 28a through the use of the weld points 10 and 20a. It will also be shown that these devices will be placed at predetermined positions to provide the proper number of securement points for the size and weight of the workpiece to be secured to the support structure.

It should also be noted that the distance between the first surfaces 12 and 14 will have a predetermined dimension "X" and this dimension "X" will, in most cases, be too large for the ultimate spacing desired in the application. The ultimate spacing desired in the application for each device may be determined mathematically and forms no part of this invention. However, what is important is that each device 10, 10a is designed for selective compression to a desired spacing "Y". This is done through suitable force exerting compression apparatuses designed to provide the proper spacing "Y" for each discrete location of the shim device 10, 10a. As shown in FIGS. 7 and 8, after such a predetermined compression force is applied to each device, it then provides the proper space "Y" for the position desired. The workpiece 30, 30a which, in the case of an automobile, can be a plastic or metal fender device with properly prepared holes 31 for the securement to the frame, can thereafter be secured to the frame with the desired spacing between the bodies.

A further aspect of the invention is the use of a self-drilling fastener 22 which includes a particularly designed washer member 24 if the support structure 30 is to be controlled itself from over compression. The fastener will include a threaded section 23 and a drill point 25 of predetermined axial length and a clamping and driving head 27.

For details of the type of washer 24 that is utilized in this invention, reference is made to U.S. Pat. Nos. 4,193,434 and 4,238,165, which are incorporated in reference herein for purposes of describing the detail of the washer 24 which accepts the compressive force of the fastener head 27 and translates it to the top surface of the device 14 rather than permitting the fastener head to compress directly against the thin workpiece 30, which may be plastic.

In practice, the support surface 28 and the upper web surface 14 are imperforate and thus no alignment is necessary in order to provide a threaded fastener. A self-drilling fastener having a drill point 26 of a length sufficient to drill both the imperforate top surface 14 and a support surface 28 is provided and a hole is drilled in each of these surfaces quickly followed by the tapping of the proper thread in each of the surfaces 14 and 28. Thus the thread engagement in both of the surfaces 14 and 28, after the fastener has been clamped, to the predetermined torque or tension stabilizes and thereafter controls the distance "Y" to the predetermined amount while the workpiece 30 is securely clamped between the head of the fastener and the spacing controlling surface 14.

It should be noted that the crushing force required to bring distance "X" to distance "Y" is much greater than the force required to drill the fastener into the device 10.

It should be apparent that changes and substitutions may be made in the preferred exemplary embodiments herein described without departing from the true scope of the invention.

I claim:

1. An adjustable shim device for use in accurately controlling the distance between a support structure and a workpiece to be fastened to the support structure, the device including a pair of spaced flange means creating a first coplanar surface for welding to a support structure and an imperforate second web section to be perforated by a self drilling threaded fastener integrally connected to the first surface by strut means, said second web section being generally parallel with said first surface, said strut means extending on both extremities of said spaced flange means interconnecting the flanges with the imperforate second web section, the strut means including a knee-like joint which includes a bend line about which the strut can be transformed to change the spatial relationship between the first section and second surface in a predetermined but accurately controlled fashion.

2. A shimming securing system utilizing the device of claim 1 wherein the flanges of the device are weldingly secured to a support structure and the location of the second section is changed by virtue of the compression of the strut to a second predetermined spaced relationship, further including a self-drilling threaded fastener which is used as a fastening and secondary shim by virtue of a threaded engagement between the second section of the shim and the support structure.

3. The shim device of claim 1 wherein the strut means is an S-shaped section interconnecting vertical strut sections to the flange means and web section in such a manner as to permit the strut to be diminished in dimension by increasing the overlapping of the S regions.

4. The shim device of claim 1 wherein the strut means is a V-shaped strut with the apex of the V extending outwardly from the regions of connections of the struts with the flange means and top web section.

* * * * *